United States Patent
Waldmann

[15] 3,689,802
[45] Sept. 5, 1972

[54] APPARATUS FOR SUPERVISING THE FUNCTIONING OF AN ANALOG PLURAL-CHANNEL REGULATING SYSTEM

[72] Inventor: Hermann Waldmann, Wiesenstr. 14, Weiher, Germany

[22] Filed: April 21, 1971

[21] Appl. No.: 135,933

[30] Foreign Application Priority Data

April 29, 1970 Germany..........P 20 20 940.9

[52] U.S. Cl..............317/27 R, 307/204, 176/19 EC, 340/146.1
[51] Int. Cl..............................................H02h 3/26
[58] Field of Search..........176/19, 19 EC, 20, 22, 24; 317/27 R; 307/85, 86, 87, 204, 219; 340/146.1; 328/92

[56] References Cited

UNITED STATES PATENTS 3,544,778  12/1970  Masters.....................307/219

FOREIGN PATENTS OR APPLICATIONS 1,280,431  10/1968  Germany

Primary Examiner—J. D. Miller
Assistant Examiner—Harvey Fendelman
Attorney—Curt M. Avery, Arthur E. Wilfond, Herbert L. Lerner and Daniel J. Tick

[57] ABSTRACT

The mean value of the amplitude of analog signals appearing on individual control paths is continuously formed. Three-level switch means are provided which are addressed by groups of two control path voltages of the individual control paths, and a disturbed control path is disconnected by the switch means, and either the output signal of the mean-value forming unit or one of the remaining connected input signals is weighted, so that failure of one control path does not significantly affect the output signal of the mean-value forming unit which is supplied to following apparatus. Thus, the failure of a control path can occur without interruption or significantly changing the operation of this supervisory apparatus. This failure can sound an alarm which pinpoints the specific location of the fault.

9 Claims, 5 Drawing Figures

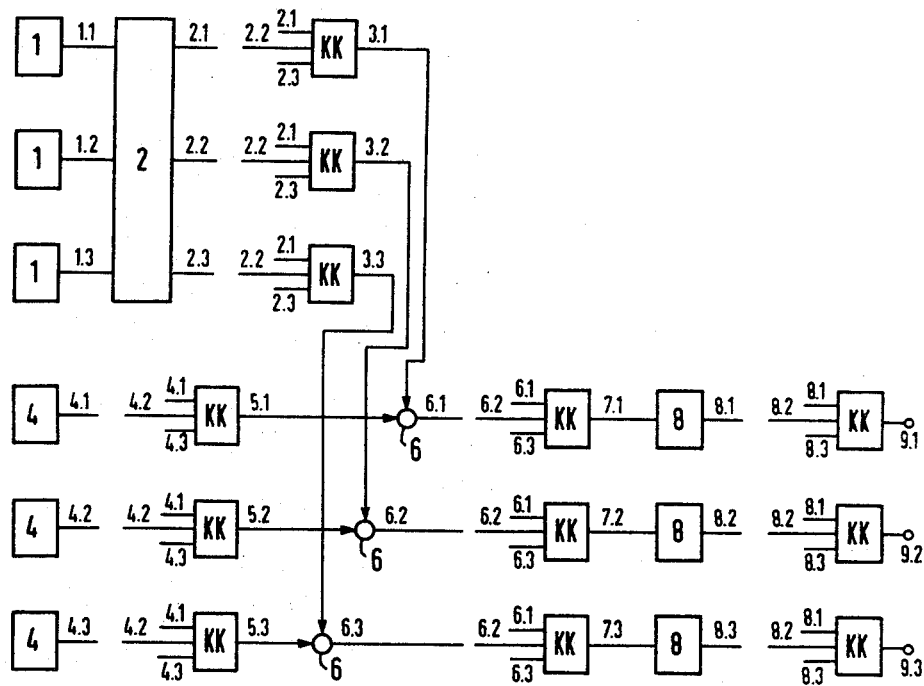
Fig.3
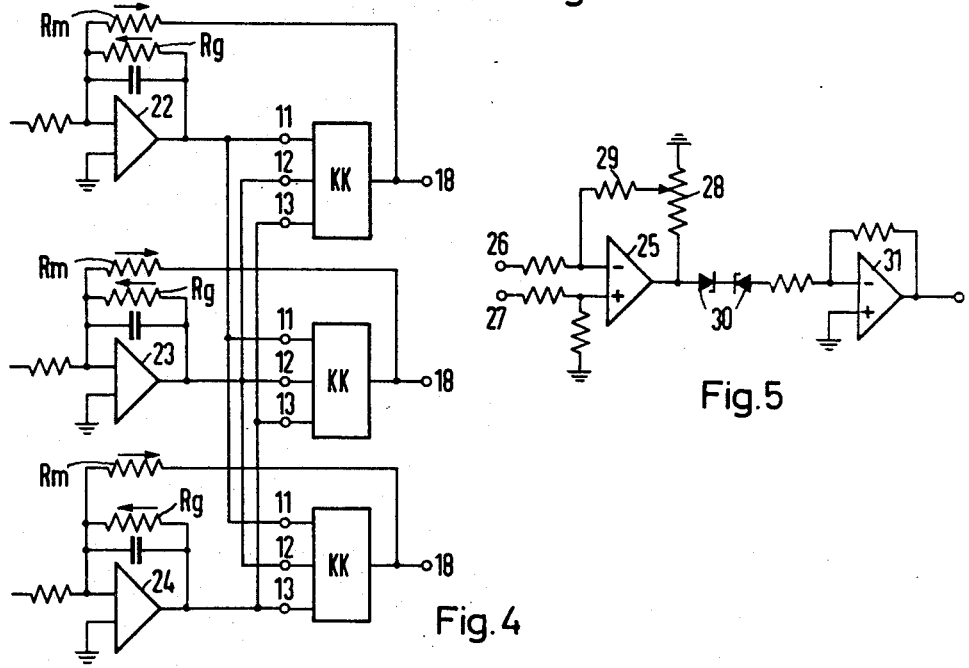
Fig.4
Fig.5

APPARATUS FOR SUPERVISING THE FUNCTIONING OF AN ANALOG PLURAL-CHANNEL REGULATING SYSTEM

My invention concerns an apparatus for supervising the functioning of the individual control paths of an analog, plural-channel regulating system, and used, for instance, in the control of nuclear reactors.

A supervisory apparatus of this kind has been published as German Provisional Pat. (DAS) 1,280,431. Of the signals appearing on three control paths, only the largest of these signals, at any one time, influences a positioning member through a maximum-selection process, while the signals of the other two control paths are merely carried for comparison purposes. A disadvantage of this method is that due to this maximum-selection process, the time-averaged mean value of the amplitude of the signal passing through the apparatus is, in principle, increased relative to the signals on the control paths in an undefinable manner if the signals are accompanied by harmonics or random, stochastic noise signals. The considerable redundancy of this arrangement, which is due to the fact that of three measuring or control systems, only one is effective at any one time, is also unsatisfactory.

An object of my invention is to provide a more accurate supervisory apparatus inserted directly in the paths of the signals supervised.

Another object of my invention is to provide a supervisory apparatus which, when a fault is sensed in one of the paths, produces an output signal for all the paths which is approximately the actual values thereof.

Still another object of my invention is to provide a supervisory apparatus in which a fault in one of the control paths being supervised does not substantially affect the operation of the supervised paths.

Another object of my invention is to provide a supervisory apparatus which pinpoints the location of the fault.

Still another object of my invention is to provide a supervisory apparatus which is less sensitive to harmonic and and other noise carried on the control paths and which may cancel such noise when a fault is detected.

Yet another object of my invention is to provide a supervisory apparatus which may be used to supervise any $n$ number of control paths in a great variety of environments.

Other objects, advantages, and features of my invention will become more apparent from the following description.

In accordance with the principles of my invention, the above objects are accomplished by providing a supervisory apparatus having two-out-of-three selection, with continuous mutual comparison of the individual control paths and undisturbed transmission of the analog signal in the event of failure of one control path. In particular, all control paths are fed disconnectibly to the inputs of a mean-value forming unit. Three-level switches are always connected with two control paths and actuate switching means for disconnecting one control path from the input of the mean-value forming unit and for simultaneously changing the weighting of either its output signal or of one of its input signals supplied by the remaining control paths. In this manner, all path signals contribute uniformly to the formation of the signal to be processed after it passes through the supervisory apparatus, and the time-averaged mean value of the signal to be processed is not changed relative to the individual measurement quantities on the control paths. Furthermore, there is the possibility that random, stochastic noise signals may mutually be cancelled in the signal to be further processed or at least attenuate each other.

The invention will be further described with reference to embodiments thereof, illustrated by way of example in the accompanying drawings in which:

FIG. 3 is a block diagram in which the supervisory apparatus of my invention is utilized;

FIG. 4 is a schematic diagram of another embodiment in which the supervisory apparatus of my invention may be utilized; and FIG. 5 is a schematic diagram of a threshold level director used with the supervisory apparatus of my invention.

Figure 1:
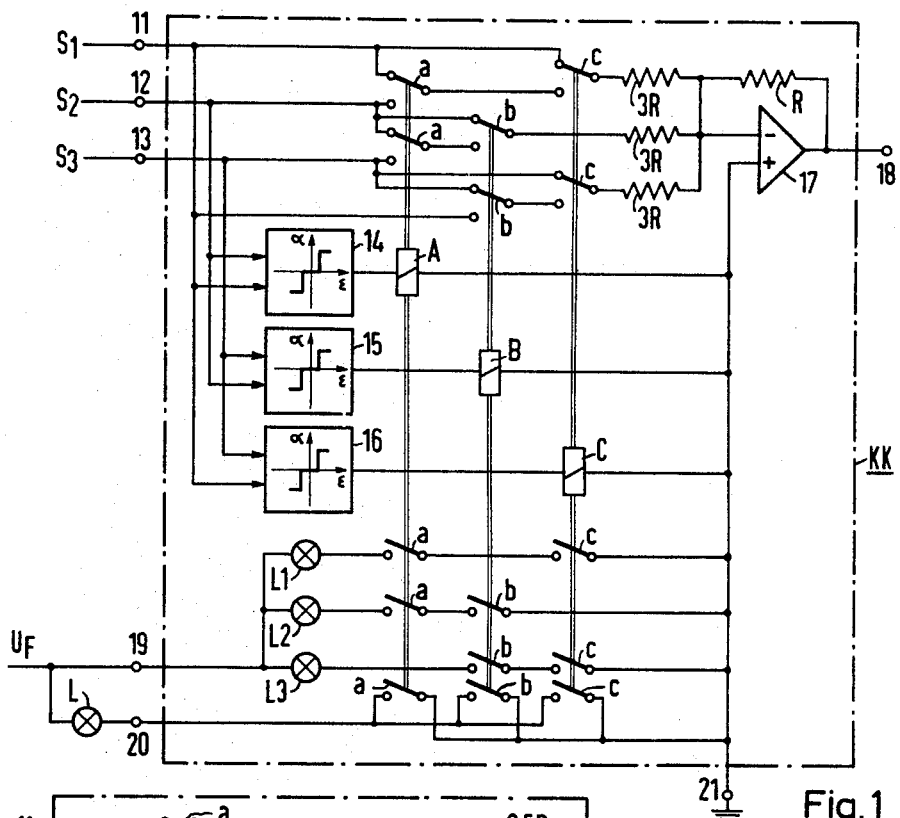
FIG. 1 is a schematic diagram of an embodiment of the two-out-of-three selection process of the supervisory apparatus of my invention.

Referring to FIG. 1, the input terminals 11, 12 and 13 of a supervisory apparatus, in accordance with my invention, designated KK (control and correction unit) and to practical advantage combined in one module, are connected with three paths S1, S2 and S3 of a three-channel control system. The paths can originate in preceding elements of the control system, not shown in detail, such as actual and preset-value transmitters, control amplifiers or other signal transmission devices.

Terminals 11 and 12 are connected with the inputs of a three-level switch 14, at the output of which there appears an output signal actuating a relay A, if the difference of the voltages appearing at the terminals 11 and 12 exceeds a small, presettable threshold value. Terminals 12, 13 and 11, 13, respectively, are connected with the additional three-level switches 15 and 16 to energize the coils of the relays B and C, respectively, in a similar manner.

The position of the contacts designated $a$, $b$ and $c$ of the relays A, B and C shown in FIG. 1 is that occupied in the unenergized state of these relays, which state exists if none of the three paths is disturbed, and therefore, all the voltage differences appearing between the terminals 11, 12 and 13 are below the threshold value. The voltages appearing on the individual control paths S1, S2 and S3 are then approximately equal. In this condition, terminal 11 is connected via a double-throw contact $c$, terminal 12 via a double-throw contact $b$ and terminal 13 via a further double-throw contact $c$ with input resistors 3R of an operational amplifier 17. The amplifier 17 in an unloaded condition has a very large gain and has a negative feedback via a resistor R, the resistance value of which is one-third of that of each of the input resistors 3R of the operational amplifier. The operational amplifier 17, thus, functions as a mean-value forming unit inasmuch as the arithmetic mean of the voltages applied to its input resistors 3R appears at its input terminal 18. If all the control paths are undisturbed, the voltage appearing at the output terminal 18 practically corresponds to each of the individual control path voltages.

To illustrate my invention, it will be assumed that, for instance, the voltage appearing on the control path S1 is disturbed and, therefore, shows a considerable difference relative to the voltages appearing on the control paths S2 and S3. In this event, the threshold alarms 14 and 16 respond and actuate the relays A and C. The voltages at the terminals 12 and 13 would now be connected via the double-throw contacts $a$ and $b$ with the input resistors 3R of the operational amplifier 17, while the input previously connected with the terminal 11 of the operational amplifier 17 is disconnectd therefrom and is now connected to the terminal 12. The voltage which exists at the terminal 12 thus also feeds the operational amplifier 17. Therefore, in forming the mean value in the operational amplifier 17, the input signal of terminal 12 carries twice the weight as that of terminal 13. The output signal at the terminal 18 therefore remains unaffected by the disengagement or fault on the disturbed path S1.

A signal lamp L1 may be connected to an external voltage $U_F$, supplied from a terminal 19, via two make contacts of the relays A and C which are actuated in case of a disturbance in the path S1. As in most cases, several of the control and correction units KK shown in FIG. 1 are used within one control system, it is desirable to provide one signal lamp L at a central point which is assigned to all such supervisory arrangements and would be connected with the terminal designated 20 of such an apparatus. The make contacts of all existing alarm relays would therefore be connected in parallel between this terminal 20 and the respective reference potential terminals 21, so that voltage is applied to the central signal lamp L even if only one of the relays A, B or C in the individual supervisory units KK pulls up. In a properly responding supervisory apparatus, the central signal lamp L, as well as two of the lamps assigned to the respective supervisory unit KK, will light.

The two-out-of-three selection process described above takes place in a corresponding manner in the event of disturbances in the control paths S2 or S3. A disturbance in the path S2 would result in the operation of the relays A and B, and a disturbance in the path S3 in the operation of relays B and C. It is possible to realize the relays shown in FIG. 1 or the functions of the contacts designated $a$, $b$ and $c$ by digital, electronically operating switching elements by using the well-known rules of Boolean algebra. As a further modification of the arrangement shown in FIG. 1, the alarm device shown in FIG. 1 in the form of the central lamp L may consist of an alarm relay which is actuated, in order to enhance the operating reliability, not by the parallel-connected make contacts of the relays A to C but serially connected break contacts of these relays (holding current principle). The operational reliability of the installation can thereby be increased further.

Figure 2:
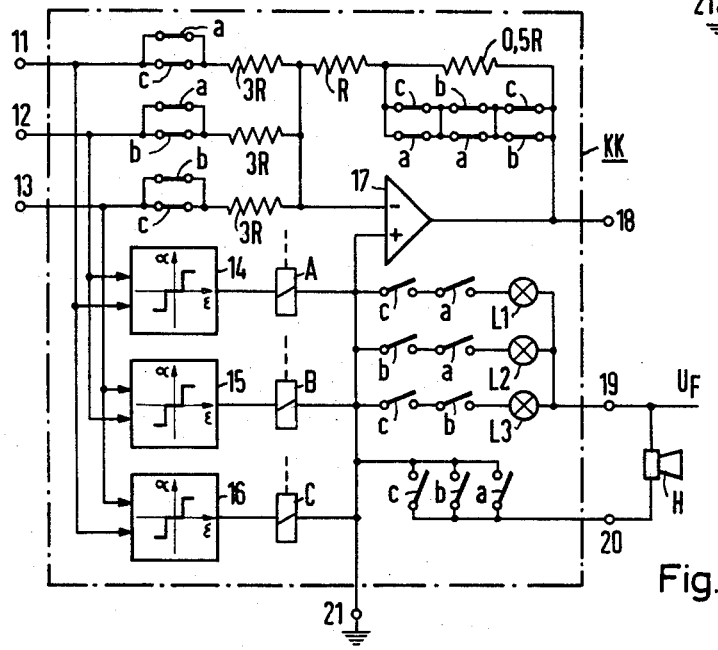
FIG. 2 is another embodiment of the supervisory apparatus of my invention.

In FIG. 2, another embodiment of the supervisory apparatus according to my invention is shown, which realizes the principle of mean-value formation with uniform participation of all control path voltages acting on the mean-value forming unit also for the disturbed case. For elements of similar function, the corresponding reference symbols of FIG. 1 are retained. The threshold indicators 14 to 16, as well as the relays A to C, are energized in exactly the same manner as in the arrangement shown in FIG. 1. The circuit part related to the fault indication has been substantially retained and a horn designated H may also be used as the central warning device.

In the undisturbed case, in FIG. 2, all relays A, B and C are unenergized and the corresponding break contacts $a$, $b$ and $c$ are closed. In the negative feedback circuit of amplifier 17, only the feedback resistor designated R is therefore effective. At the output terminal 18 of the amplifier there appears the sum, multiplied by the factor 1/3, of the three input voltages applied to the terminals 11, 12 and 13. The part of the negative feedback path that is bridged by a series-parallel arrangement of contacts $a$ to $b$ has a resistance R/2, exactly half the resistance of the resistor R. Therefore, the sum of the input voltages originating in the two undisturbed control paths is multiplied by the operational amplifier by a factor of ½ through the opening of the break contact $a, c, a, b$ or $b, c$ and is passed on to the output terminal 18. A different weighting of the output signal of the mean-value forming unit, therefore, is accomplished relative to the sum of its input signals.

The essential difference of FIG. 2 re the arrangement of FIG. 1 consists in that the path voltages to be connected to the input terminals 11, 12 and 13 are fed, via the parallel circuit of break contacts, to the input resistors of those two relays, which respond in case of a disturbance in the path in question, and that by a series-parallel circuit of further break contacts of these relays, the negative feedback resistance of the operational amplifier 17 is, in part, varied in such a manner, that upon disconnecting one control path from the input of the amplifier, the gain of the latter increases by a factor of 3/2 relative to the undisturbed condition.

In the variant according to FIG. 2, it becomes clear how the two-out-of-three selection monitoring circuit could readily be expanded to a three-out-of-four selection monitoring circuit or, generally, to an ($N-1$)-out-of-$n$ selection monitoring circuit. For a three-out-of-four selection process, a total of six ( or in general, $n(n-1) \cdot ½$) three-level switches would be required for any possible combination of two path voltages, and break contacts of the respective three ( or in general, $n-1$) relays that can be influenced by a path voltage would have to be connected in parallel in the input and negative feedback circuit of the operational amplifier 17 in a manner analogous to FIG. 2. The input resistor and the parts of the negative feedback resistance that can and cannot be bridged would have the ratio 4 : 1 : ⅓ ( or in general $n$ : 1 : $1/n - 1$). Although a three-out-of-four system offers a higher degree of reliability than the two-out-of-three system, it is substantially more expensive, so that it appears that its use would be limited, for example, to the field of reactor technology.

The function-supervising apparatus according to my invention could be used in a control system with three paths in such a manner that three output signals of the mutually corresponding control circuit elements in the three control paths are controlled or corrected by only one monitoring arrangement, and the output signal of the latter is fed in parallel to the inputs of three following, signal-processing control circuit elements. With this arrangement, however, the supervisory function according to the two-out-of-three selection process would not include the control and correction members themselves because with such an arrangement, the separation of the three-channels of the control system would be violated. It is therefore practically advantageous to provide a control and correction circuit for each signal-processing control circuit element, so that three correction circuits are always addressed in parallel by the output of a control circuit element.

FIG. 3 shows the schematic diagram of such an arrangement. The output quantities 1.1, 1.2, and 1.3 of three similarly constructed reference value transmitters are processed by a remote-transmission arrangement 2 into the output signals 2.1, 2.2 and 2.3 which address three control and correction members KK according to FIG. 1 or FIG. 2. The outputs 3.1, 3.2 and 3.3 act as reference values for three mixers designated 6, to which are fed output quantities 5.1, 5.2 and 5.3 of further function supervising units KK which are fed in an analogous manner by three actual-value transmitters designated 4. In order to monitor the control system sections following the mixers 6 and controls 8, three further supervisory units KK are respectively provided which at their inputs are connected in a corresponding manner with the outputs of the control system elements preceding them. The system shown in FIG. 3 permits continuous supervision and simple and unambiguous fault location, as the occurrence of trouble is reported by the central warning device and the trouble location can be determined by the signal lamps L1 to L3 assigned to the individual sections of the control circuit.

The monitoring of controls with an integrator, operating in parallel, could present problems, since it is possible that three mutually independent integrating controls could assume different output voltages due to unavoidable tolerances in the formation of the signal deviation and with respect to the operating point of the integrator. Therefore, monitoring circuits assigned to the integrators would respond unintentionally even if they otherwise function properly.

The circuit shown in FIG. 4 prevents this situation by letting each of the integrating controls 22, 23 and 24 arranged in the three controlled systems provide, by means of a negative feedback resistor $R_g$ connected with the input of the correction and supervisory circuit KK a static condition, which is normally fully compensated by positive feedback from the output 18 of the mean-value forming unit via a resistor $R_m$ of the same magnitude as $R_g$. The mentioned tolerances in the signal deviation then take effect only to the extent that the output voltages of the three integrating controls 22 to 24 showing slight differences, which can be taken into account by suitable adjustment of the response limits of the three-level switches in the control and correction circuits KK. In this manner, the output voltages of all integrating controls are matched to each other in the undisturbed condition, while supervision in the case of a disturbance, for instance, in the event of a sudden, fault-connected rise of the output voltage of one control to the limit point, is assured in the manner described above.

An example of an embodiment of the three-level switch designated 14 to 16 in FIGS. 1 and 2 is shown in FIG. 5. The switch consists of an operational amplifier 25, the input terminals 26 and 26 of which are fed the voltages to be compared with each other. The output of the amplifier 25 is connected via a low-resistance potentiometer 28 to a reference potential with the tap of the potentiometer connected to a negative feedback resistor 29. The negative feedback resistor 29 as well as the other resistors connected with the amplifier inputs designated with + and − are of the same magnitude. The amplifier output is connected via two series-connected diodes 30, for example, Zener diodes, with the input of an amplifier 31 of such high gain that its output voltage practically assumes its maximum, either positive or negative, if the input voltage is different from zero. At a given difference, adjustably by the potentiometer 28, of the voltages applied to the input terminals 26 and 27, the breakdown voltage of one of the diodes 30 is exceeded, so that the output signal of the amplifier 31 suddenly jumps to its output limit. The functions indicated in the block diagram for the elements 14 and 16 in FIGS. 1 and 2 can thus be achieved in this manner.

It will thus be seen that the objects set forth above, among those made apparent from the preceding description, are efficiently attained and, since certain changes may be made in the above apparatus without departing from the scope of the invention, it is intended that all matter contained in the above description and shown in the accompanying drawings shall be interpreted as illustrative and not in a limiting sense.

I claim:

1. Apparatus for supervising the operation of a plurality of control paths of an analog plural-channel regulation system and sensing a failure in one of said paths, comprising comparison means for continuously comparing the signal amplitudes on pairs of said plurality of control paths, mean-value forming means for receiving said signal amplitudes as inputs and forming an output which is the mean of the inputs applied thereto, said output being at an output level without a failure on any of said paths, and switch means responsive to a predetermined difference between said compared pairs for disconnecting one of said control paths from said mean-value forming means and maintaining the output of said mean-value forming means at approximately the output level when a failure occurs in one of said paths.

2. Apparatus as set forth in claim 1, wherein upon the occurrence of a failure in one of said paths, said switch means changes the weighting of one of the inputs still connected to said mean-valve forming means.

3. Apparatus as set forth in claim 1, wherein upon the occurrence of a failure in one of said paths, said switch means changes the weighting of the output of said mean-value forming means.

4. Apparatus as set forth in claim 1, wherein said number of paths is three and said apparatus operates in a two-out-of-three selection mode.

5. Apparatus as set forth in claim 3, wherein said mean-value forming means comprises an operational amplifier and a feedback resistor, said switching means changing the resistance of said feedback resistor responsive to the occurrence of a fault in one of said paths.

6. Apparatus as set forth in claim 1, comprising a plurality of warning means with respective ones of said warning means associated with respective ones of said plurality of paths, said one of said warning means being energized when a failure occurs in an associated control path.

7. Apparatus as set forth in claim 6, comprising a central warning means being energized when a failure occurs on any of said plurality of paths.

8. Apparatus as set forth in claim 1, wherein said comparison means comprises a first operational amplifier having two inputs connected with respective ones of said pairs of control paths and a variable feedback resistance for varying the gain of said operational amplifier, Zener diode means and a second operational amplifier, said Zener diode means connected in series between said first and second operational amplifiers.

9. Apparatus as set forth in claim 1, comprising integrating members within said control paths, the inputs of said mean-value forming means being coupled through a negative feedback coupling to the input of an integrating member, the output of said mean-value forming unit being coupled through a positive feedback coupling to the input of said integrating member.

* * * * *